Oct. 15, 1968     A. K. SIMSON     3,405,464
DISPLAY DEVICE

Filed May 17, 1966     3 Sheets-Sheet 1

INVENTOR
ANTON K. SIMSON
BY
*Busser Smith & Harding*

ATTORNEYS

Oct. 15, 1968   A. K. SIMSON   3,405,464
DISPLAY DEVICE
Filed May 17, 1966   3 Sheets-Sheet 2
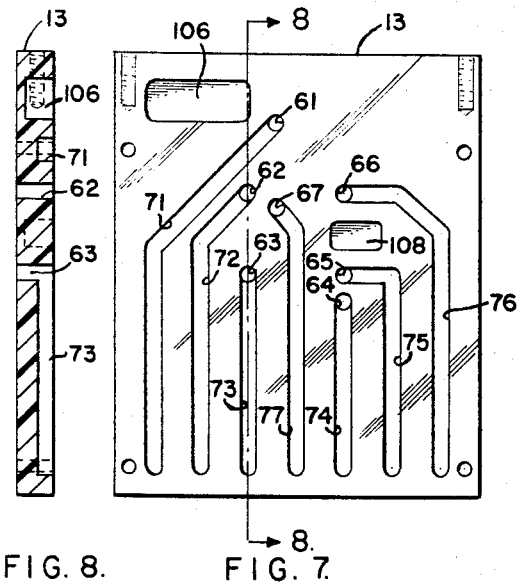
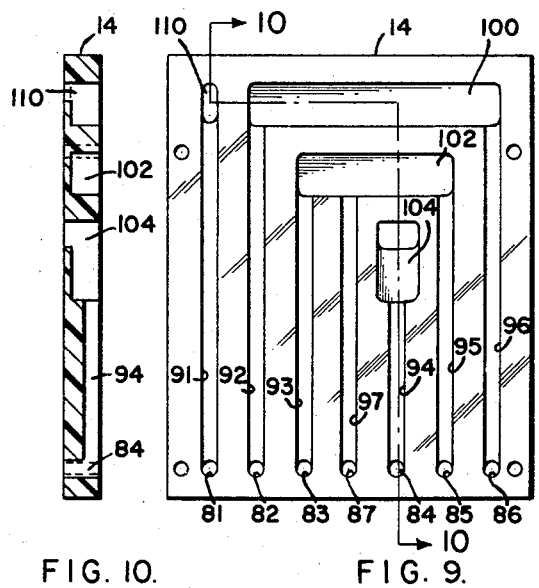
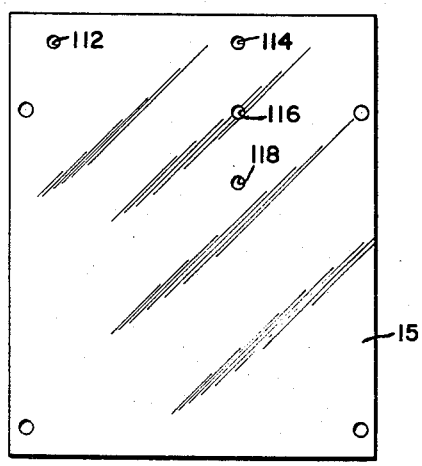
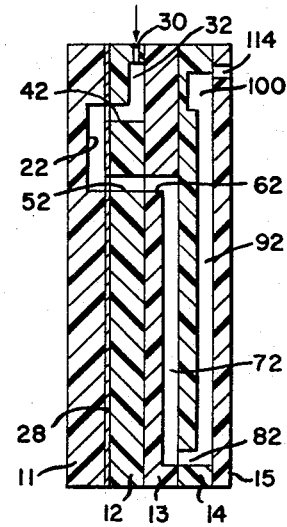
FIG. 8.   FIG. 7.   FIG. 10.   FIG. 9.
FIG. 11.   FIG. 12.
INVENTOR
ANTON K. SIMSON
BY
Busser Smith & Harding
ATTORNEYS United States Patent Office 3,405,464
Patented Oct. 15, 1968

3,405,464
DISPLAY DEVICE
Anton K. Simson, Glenolden, Pa., assignor to John P. Glass, trading as Cava Industries, Essington, Pa.
Filed May 17, 1966, Ser. No. 550,853
9 Claims. (Cl. 40—28)

ABSTRACT OF THE DISCLOSURE

A display device including a body having a light transmitting display member, and a plurality of individual passages in the body with each of the passages having a display portion, each of the passages being formed in the shape of a manometer column containing colored fluid with one end of each passage being connected to a reservoir for the colored fluid, with the reservoir of a passage being elevated from the display portion of that passage. The display portions are arranged in three levels, and a separate reservoir is provided for each level.

---

This invention relates generally to display devices and more particularly to a display device of the type comprising fluid display elements.

It is the general object of this invention to provide an improved fluid display device which is simple in design, compact, dependable and adapted for fast response to input signals. Briefly stated, the general object of the invention is achieved by the provision of a plurality of individual passages in a body, each of the passages having a display portion. There is also provided means for supplying colored fluid to each of the passages for filling the display portions thereof. Each of the passages is adapted to be responsive to one pressure input signal whereby its display portion is filled with colored fluid and to be responsive to a second pressure input signal whereby its display portion is emptied. The display portions of the passages are arranged in a group relative to one another and have configurations such that all the different symbols to be displayed by the device can be displayed by the filling, with colored liquid, of a combination of said display portions. By this arrangement, the display device can be responsive to pressure input signal to each of said individual passages so that various display portions are filled with the colored fluid and various other display portions are empty, the filled display passages cooperating to provide a visual display of the symbol desired.

The above and other objects and features of the invention will become apparent from a consideration of the following description in conjunction with the accompanying drawings, in which:

FIGURE 7 is a rear view of another body plate, said view being taken generally on line 7—7 in FIGURE 2;

FIGURE 8 is a sectional view taken on line 8—8 of FIGURE 7;

FIGURE 9 is a rear view of another body plate, said view being taken generally on line 9—9 of FIGURE 2;

FIGURE 10 is sectional view of line 10—10 of FIGURE 9;

FIGURE 11 is a rear view of the rear body plate, said view being taken generally on line 11—11 of FIGURE 2;

FIGURE 12 is a sectional view of the body portion of the device shown in FIGURES 1 and 2.

Figure 2:
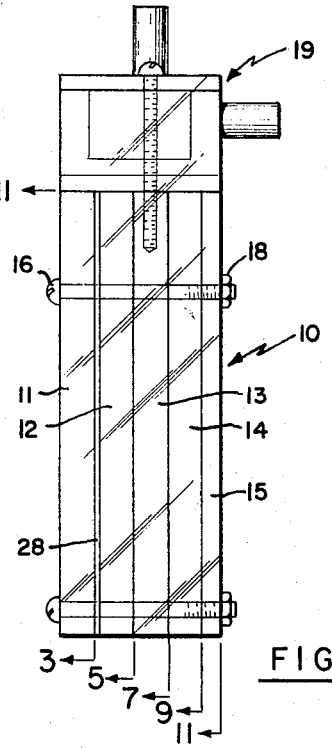
FIGURE 2 is a right side view of the device shown in FIGURE 1.
Figures 3, 4:
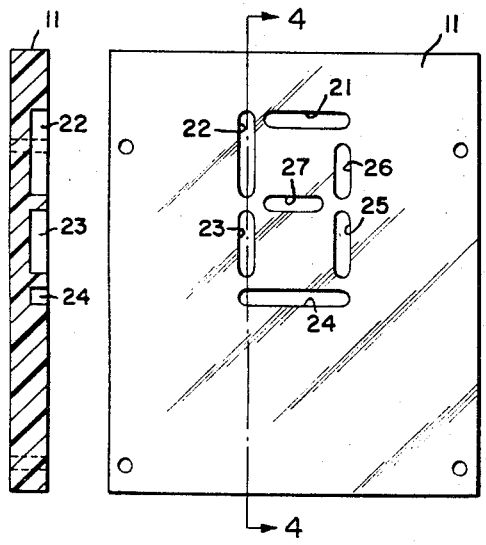
FIGURE 3 is a rear view of the front plate of the body of the display device, said view being taken generally on line 3—3 of FIGURE 2.
FIGURE 4 is a sectional view taken on line 4—4 of FIGURE 3.

The display device in accordance with the invention comprises a generally rectangular body 10 including five plates 11, 12, 13, 14, and 15 secured tightly together, as shown in FIGURE 2, by four screws 16 which extend transversely through the plates for threaded engagement with nuts 18. Mounted on top of the body 10, as by mounting screws, is a housing 19 which comprises the control means which per se forms no part of the present invention. One suitable control means may comprise a device for providing pressure signals through the seven downwardly extending ports 20 in the bottom wall of the housing 19 in response to the input signal to the control means. Control means of this type are well-known, one suitable form including a fluidic system which changes the signals from a computer into jets of air through various ones of the ports 20. Thus, the output from each of the ports 20 may consist of one of two signals, either a "no-flow" or a "flow" signal. The display system in accordance with the invention is adapted to receive such pressure signals and convert them into a visual display.

While the form of display described herein involves a numerical display, it will be apparent that an alphabetic display or a display of other symbols may be provided by the use of the principles in accordance with the invention.

Figure 1:
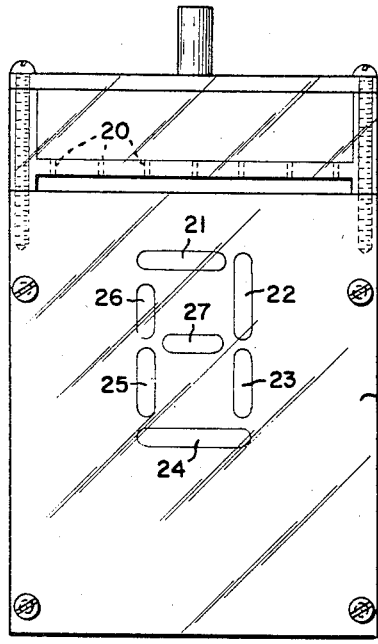
FIGURE 1 is a front elevation view of a display device in accordance with the invention.

The front plate 11 is made of a light transmitting material, preferably plastic, and is provided with seven channels in the rear face thereof, such channels being indicated at 21, 22, 23, 24, 25, 26 and 27. As shown in FIGURE 1, the channels 21–27 are arranged to form a generally straight-sided "figure eight," which, considering that the body 10 is to be vertically mounted as shown, consists of a top horizontal channel 21, a pair of upper vertical channels 22 and 26, a pair of lower vertical channels 23 and 25, a bottom horizontal channel 24 and a medial horizontal channel 27. These channels 21–27 form the display portions of the display device and, by reason of the arrangement shown, can display any number from 0 to 9 by having various channels filled with a colored fluid, the light transmitting plate 11 permitting the visual observation of such channels from the front of the device.

The manner in which the display portions may be utilized to provide a visual display of the numerals 0 to 9 will be described hereafter with particular reference to FIGURE 1. In order to display the numeral "0," the channels 21, 22, 23, 24, 25 and 26 are filled with colored fluid while channel 27 is empty. In order to display the numeral "1," the channels 22 and 23 are filled with colored fluid, the remaining channels being empty. In order to display the numeral "2," channels 21, 22, 27, 25 and 24 are filled with colored fluid, the remaining channels being empty. In order to display the numeral "3," channels 21, 22, 27, 23 and 24 are filled with colored fluid, the remaining channels being empty. In order to display the numeral "4," channels 26, 27, 22 and 23 are filled with colored fluid, the remaining channels being empty. In order to display the numeral "5," channels 21, 26, 27, 23 and 24 are filled with colored fluid, the remaining channels being empty. In order to display the numeral "6," channels 26, 25, 24, 23 and 27 are filled with colored fluid, the remaining channels being empty. In order to display the numeral "7," channels 21, 22 and 23 are filled with colored fluid, the remaining channels being empty. In order to display the numeral "8," all the channels are filled with colored fluid. In order to display the numeral "9," channels 27, 26, 21, 22, and 23 are filled with colored fluid, the remaining channels being empty.

The device comprises means for providing the colored fluid for each of the display portions formed by channels 21–27, such means including passage means, reservoirs, and colored fluid. The passage means and the reservoirs are formed in the plates forming body 10 in a manner to be described hereafter and contain a suitable quantity of colored fluid.

Figures 5, 6:
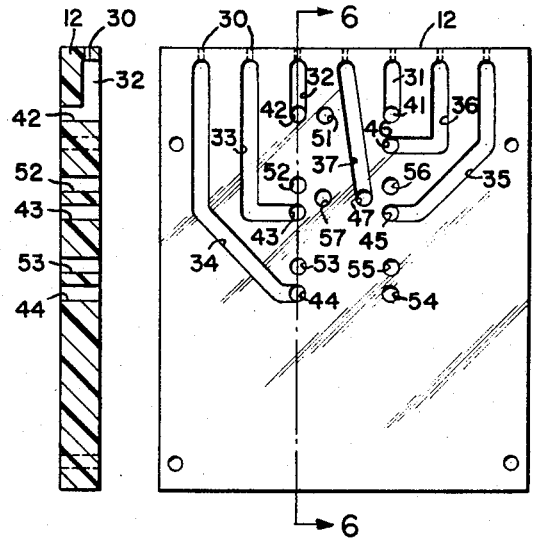
FIGURE 5 is a rear view of another body plate, said view being taken generally on line 5—5 in FIGURE 2.
FIGURE 6 is a section taken on line 6—6 of FIGURE 5.

In order to block from view, from the front of the device, the various passages and reservoirs for the colored fluid, there is provided a thin mask 28 between plates 11 and 12. The mask 28 blocks from view all the passages behind the plate 11 but is provided with openings to permit the flow of colored fluid to and from the channels 21–27. As shown in FIGURES 5 and 6, the plate 12 is provided with seven channels 31, 32, 33, 34, 35, 36 and 37 each of which extends downwardly from an upper portion of the plate 12 to one of the transversely extending ports 41, 42, 43, 44, 45, 46 and 47, respectively. The plate 12 is provided with seven vertically extending orifices 30 in alignment with the ports 20 of the housing 19 of control means, such orifices 30 communicating at their lower end with the upper ends of channels 31–37. As shown in FIGURE 5 the channels 31–37 extend downwardly in various configurations and communicate at their lower end with the transversely extending ports 41–47, respectively. In turn, the ports 41–47 communicate with one end of the channels 21 to 27, respectively. The plate 12 is also provided with seven horizontal ports 51, 52, 53, 54, 55, 56 and 57 which extend therethrough. Ports 51–57 communicate at their forward end with the ends of channels 21–27 opposite from the ends thereof in communication with the ports 41–47.

The plate 13 is provided with a plurality of transversely extending ports 61, 62, 63, 64, 65, 66 and 67 which are arranged in communication at their forward ends with the ports 51–57 in plate 12. Plate 13 is also provided with seven channels 71, 72, 73, 74, 75, 76 and 77 in the rear face thereof. Channels 71–77 communicate at their upper ends with ports 61–67, respectively, and extend downwardly therefrom in the configurations shown in FIGURE 7. The channels 71–77 all terminate at a lower portion of plate 13.

Plate 14 is provided with a plurality of horizontal ports 81, 82, 83, 84, 85, 86 and 87 extending transversely therethrough. The ports 81 to 87 communicate at their forward end with the lower ends of channels 71–77, respectively. Plate 14 also comprises a plurality of vertically extending channels 91, 92, 93, 94, 95, 96 and 97 in the rear face thereof, such channels 91–97 communicating at their lower end with the ports 81–87, respectively.

Plate 41 is provided with three cavities 100, 102 and 104 for forming colored fluid reservoirs, said cavities being vertically spaced as is best shown in FIGURE 9. Plate 13 is provided with a pair of reservoir forming cavities 106 and 108 in the rear face thereof. When the device is assembled, cavity 106 communicates with a large port 110 formed in plate 14 and having a portion extending transversely through the plate 14. Also, cavity 108 communicates with the cavity 104 which has a portion extending to the front face of plate 14.

The above-described cavities provide the reservoirs for the colored fluid which is supplied to the various individual passageways. Cavity 100 and cavity 106 are located at an upper level and may be termed upper level reservoirs. Cavity 102 forms the medium level reservoir. Cavities 104 and 108 cooperate to form the lower level reservoir.

The channel 91 extends upwardly to port 110 which cooperates with the upper level reservoir formed by cavity 106. Channels 92 and 96 communicate at their upper ends with the upper level reservoir formed by cavity 100. Channels 93, 97 and 95 communicate at their upper ends with the medium level reservoir formed by cavity 102. Channel 94 communicates at its upper end with the lower level reservoir formed by cavities 104 and 108.

The rear plate 15 is provided with four ports 112, 114, 116 and 118 extending transversely therethrough. The port 112 provides communication between the upper level reservoir 106 and atmosphere. Port 114 provides communication between the upper level reservoir 100 and atmosphere. The port 116 provides communication between the medium level reservoir 102 and atmosphere. The port 118 provides communication between the lower level reservoir 104 and atmosphere.

Each of the reservoirs is provided with an appropriate quantity of colored fluid so that the various passageways supplied thereby will fill, by gravity flow, the display portions associated therewith. Thus, the upper level reservoir 106 serves as the supply for display portion 21, and the upper level reservoir 100 serves as the supply for upper level display portions 22 and 26. The medium level reservoir 102 serves as the supply for medium level display portions 23, 25 and 27. The lower level reservoir 104 serves as the supply for lower level display portion 24. The reservoirs are constructed of sufficient size to accept and contain colored liquid flow from said passages when all the display portions associated therewith may have colored liquid removed therefrom, with a corresponding flow to the reservoirs.

It will be noted that by reason of the construction described above, there are provided seven individual passageways each of which extends from one of the ports 30 through one of the display portions 21–27 to one of the reservoirs. One of these passageways is illustrated in FIGURE 12, this passageway being associated with the display portion 22. Thus, there is provided a passageway extending from a port 30 by way of channel 32, port 42, display channel 22, port 52, port 62, channel 72, port 82 and channel 92 to reservoir 100.

The individual passageways for the other display portions are arranged in a similar manner. Thus, the individual passageway for display portion 21 comprises a port 30, channel 31, port 41, channel 21, port 51, port 61, channel 71, port 81, and channel 91. The passageway for display portion 23 comprises a port 30, channel 33, port 43, channel 23, port 53, port 63, channel 73, port 83, and channel 93. The passageway for display portion 24 comprises a port 30, channel 34, port 44, channel 24, port 54, port 64, channel 74, port 84, and channel 94. The passageway for display portion 25 comprises a port 30, channel 35, port 45, channel 25, port 55, port 65, channel 75, port 85, and channel 95. The passageway for display portion 26 comprises a port 30, channel 36, port 46, channel 26, port 56, port 66, channel 76, port 86, and channel 96. The passageway for display portion 27 comprises a port 30, channel 37, port 47, channel 27, port 57, port 67, channel 77, port 87 and channel 97.

Figure 13:
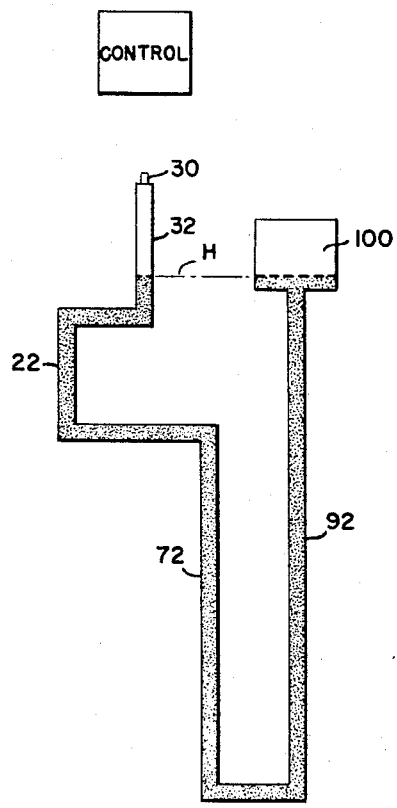
FIGURES 13 and 14 are schematic views illustrating the operation of the device in accordance with the invention.
Figure 14:
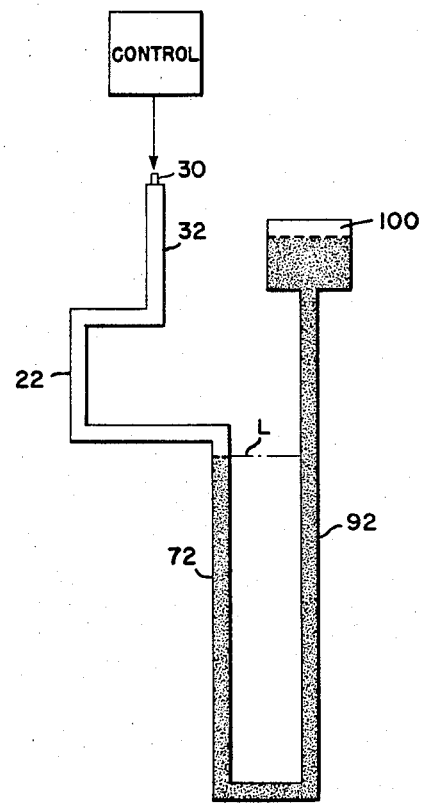

It will be apparent that each of the above-described passageway means in effect defines the equivalent of a manometer passage and colored fluid therein forms a continuous column of liquid as in a manometer arrangement. It will be apparent that each of the manometer columns will function in the same general way to achieve a visual display in the associated display portion. The manner in which this is achieved will be described with respect to FIGURES 13 and 14 wherein there is provided a schematic illustration of the passageway for the display portion 22. In FIGURE 13, the passageway means is shown in the condition when there is no pressure input signal to the orifice 30 of the passageway from the control means. Thus, the colored liquid seeks a level condition as shown. The upper level of the liquid in the leg of the passageway containing display portion 22 is indicated at "H" and is such that the entire display portion 22 will be filled with colored fluid. Accordingly, the display portion 22 will be visible when the device is viewed from the front thereof. However, when it is desired that the display portion 22 not contain any colored liquid, the control means is set to provide a pressure input signal into the one end of the passageway by way of a passage 30 in communication with the upper end of channel 32. The device is set so that this pressure input signal is sufficient to force the liquid from the display portion 22 to the level indicated at "L" which is below the bottom of the display portion 22. Accordingly, the display portion 22 will not contain any colored liquid whereby, as viewed from the front of the device, this display portion will be relatively unobservable as compared with display portions containing colored fluid. It will be evident that to achieve this result, the input pressure should be able to overcome the pressure head of the color liquid in channel 92 and reservoir 100 above level L.

Each of the seven individual passageways can be actuated between the two condtions described above with respect to the passageway for display portion 22. Accordingly, by providing individual pressure signals to various of these seven passageways, the display portions associated therewith can be emptied. The remaining display portions will contain colored fluid and will be observable for providing a visual display.

If desired, the front face of front plate 11 may be covered by a perforated screen that will aid in delineating the symbol presented by obscuring the unfilled channels 21–27.

It will be evident that the display device in accordance with the invention achieves a display of symbols by means of a fluid responsive arrangement which is simple in construction and economical to manufacture. Moreover, the fluid display device in accordance with the invention is very reliable in operation and involves an essentially wear-free construction. Furthermore, by reason of the multiple lever reservoir fluid supply arrangement, the liquid columns are responsive to relatively low input pressures of the essentially same size. In the case of a single level, it would be necessary to have a relatively high pressure supply sufficient to balance the pressure head produced by evacuating the lowest display portion against a supply reservoir which must be high enough to supply the highest display portion.

It will be apparent that various changes may be made in the construction and arrangement of parts without departing from the scope of the invention wherefore it is not desired to be limited except as required by the following claims.

What is claimed is:

1. A display device comprising a body, means defining a plurality of individual passages in said body, each of said passages having a display portion, said body including a light transmitting display member, said display portions being arranged to be observable visually through said display member, means for supplying colored fluid to each of said passages to fill each display portion individually in response to a pressure condition in the passage associated therewith whereby said filled display portion is visible through said display member, said display portions being arranged in a group relative to one another and having configurations such that all the symbols to be displayed by said device can be displayed by the filling of a combination of said display portions with said colored fluid, said display portions being formed in said display member, and a plurality of pressure supply passages in said body and comunicating with the exterior of said body, said colored fluid supply means comprising a reservoir means formed in said body, each of said display portions comprising an elongated configuration, one end of each display portion being connected to said reservoir means and the other end of each display portion being connected to one of said pressure supply passages, said display member being vertically mounted, said display portions being arranged in a plurality of levels, said reservoir means comprising a separate reservoir for each of said levels, with each reservoir positioned at a different level to correspond to the levels of said display portions and with the higher reservoir connected to the higher display portion and the lower reservoir connected to the lower display portion.

2. A display device according to claim 1, comprising a mask between said display member and the rest of said body for blocking from view the passages in said body behind said display member.

3. A display device according to claim 1 wherein said body comprises a plurality of adjacent plates secured together tightly and having said passages and reservoir means formed therein, said display member forming the front plate of said body.

4. A display device according to claim 3 wherein said body comprises a second plate behind said display member plate and provided with a passage portion for each of said passages connected from the exterior of said body to one end of each of said display portions, said second plate having a port associated with each display portion and in communication with the other end thereof, a third plate behind said second plate providing the downwardly extending passage portion associated with each display portion and connected at its upper end with one of said ports in said second plate.

5. A display device according to claim 4 comprising a fourth plate providing a vertically extending passage portion for each display portion the lower ends are connected to the lower end of said passage portions formed in said third plate and the upper ends of which is connected to said reservoir means.

6. A display device according to claim 1 wherein said display portions are arranged in three levels, said reservoir means comprising a separate reservoir for each of said levels, each reservoir being arranged above the level of said display portions associated therewith to permit gravity flow of colored fluid from said reservoir to said display portion.

7. A display device according to claim 6 wherein said display portions are arranged in a group comprising an upper horizontally extending display portion, a pair of vertically extending display portions beneath said upper horizontal display portions, a medial horizontally extending display portion beneath said upper vertically extending display portions, a pair of lower vertically extending display portions beneath said medial horizontal display portion and a lower horizontal display portion beneath said lower vertical display portions.

8. A display device according to claim 7 wherein said display portions are arranged to provide a configuration generally like a figure eight.

9. A display device according to claim 7 wherein said separate reservoirs are arranged in an upper level, a medium level and a lower level, said upper horizontal display portion and said upper vertical display portions are connected to the upper level reservoir, said medial horizontal display portion and said lower vertical display portions are connected to the medium level reservoir, and said lower horizontal display portion is connected to the lower level reservoir.

References Cited

UNITED STATES PATENTS 2,621,430   12/1952   Neville _____ 40—106.21
3,200,525   8/1965    Francis.
3,249,302   5/1966    Bowles _____ 40—106.22 X EUGENE R. CAPOZIO, *Primary Examiner.*

W. J. CONTRERAS, *Examiner.*